United States Patent
Miura et al.

[15] 3,673,553
[45] June 27, 1972

[54] MEASURING INSTRUMENT FOR PILOTING SHIP FOR DOCKING OR LEAVING

[72] Inventors: Takahiro Miura, Kawasaki; Miaki Yamamoto, Tokyo, both of Japan

[73] Assignee: Kabushikikaisha Tokyo Keiki Seizosho, Tokyo, Japan

[22] Filed: June 8, 1970

[21] Appl. No.: 44,397

[30] Foreign Application Priority Data

June 17, 1969 Japan.....................................44/47809

[52] U.S. Cl...............................................340/3 R, 340/5 S
[51] Int. Cl...........................................................G01s 9/68
[58] Field of Search..........................340/1, 1 C, 3, 16 C, 5 S

[56] References Cited

UNITED STATES PATENTS

| 2,629,082 | 2/1953 | Hare | 340/1 |
| 2,972,731 | 2/1961 | Beebe | 340/3 |

*Primary Examiner*—Richard A. Farley
*Attorney*—Hill, Sherman, Meroni, Gross & Simpson

[57] ABSTRACT

A measuring instrument for piloting a ship for docking or leaving a pier having at least two spaced ultrasonic transducer means provided under water on the side of the pier for transmitting ultrasonic beams substantially perpendicular to the mooring line joining the front surfaces of dolphins, measuring means respectively corresponding to the ultrasonic transducer means, means for measuring the distance between the ship and the pier and the speed of the ship, and means for reporting the measured results to a pilot on the ship.

4 Claims, 2 Drawing Figures

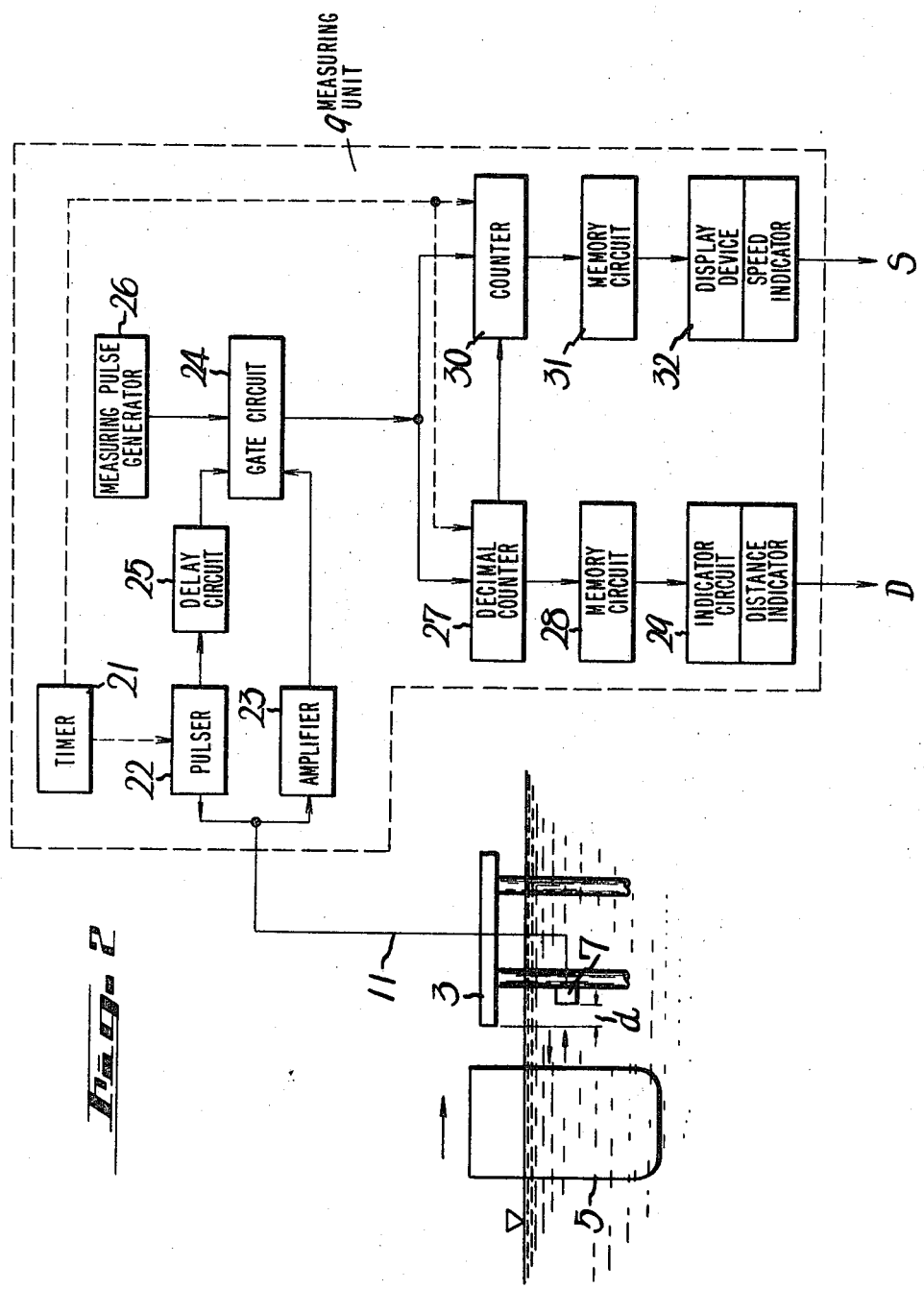

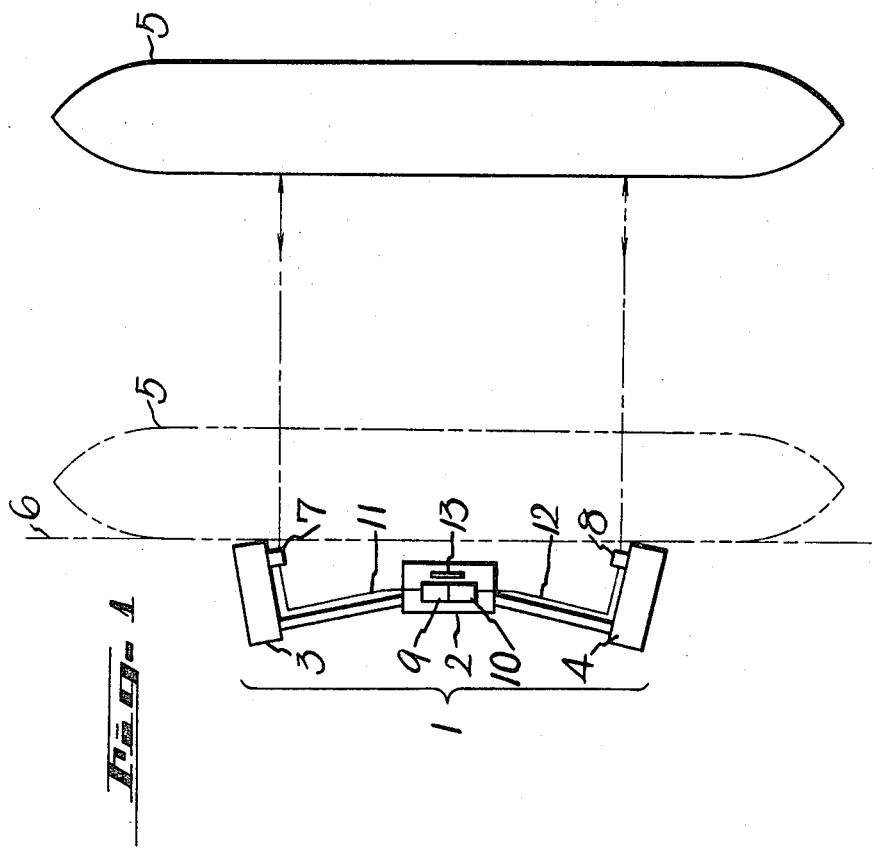

MEASURING INSTRUMENT FOR PILOTING SHIP FOR DOCKING OR LEAVING

BACKGROUND OF THE INVENTION

1. Field of the Invention

This invention relates to a measuring instrument for piloting a ship for docking which is of the type that the parallel distance between the ship and a dock or pier and her approaching or leaving speed are measured on the side of the dock or pier and the measured results are reported to the ship to control her direction and speed so as to secure safety in the docking operation.

2. Description of the Prior Art

Various methods have been proposed for measuring the distance between the pier and the ship and/or her docking speed and some principal ones of them are as follows.

a. Docking method using Doppler effect:

An attempt for utilizing the Doppler effect in the docking operation has been made in American ships for the last several years. In one example using this method Doppler Sonar method, electro-mechanical transducers having operations for producing ultrasonic waves upon reception of electric signals and producing electric signals upon reception of ultrasonic waves are mounted on the ship's hull near the bow and the stern and ultrasonic waves are obliquely transmitted from the transmitter in four directions toward the sea bed and the reflected waves therefrom are received by the receiver. In this case the frequencies of the received waves are different from those of the transmitted waves under the influence of the Doppler effect, so that the speed of the ship can be obtained from the Doppler deviation frequencies with a precision of, for example, 0.01 knot (about 5 mm/sec.) and the ship's heading can be calculated based on the information from four directions. With this method, the lateral speeds of the bow and the stern are continuously measured by the transducers located near the bow and the stern and a captain or pilot on the ship commands steerage of the ship according to the information so as to achieve the docking operation as promptly as possible without exceeding a predetermined docking speed, while maintaining the ship parallel with the pier. However, the Doppler sonar method necessitates the installation of a measuring instrument for docking operation on each ship and requires two sets of expensive transducers for each ship. Further, the measuring instrument on the ship for accurately measuring a velocity as low as 1 cm/sec irrespective of her pitching, rolling and upward and downward movements is inevitably complicated and bulky.

b Docking method using radio wave:

This method does not appear to have been used recently but includes the following systems.

1. Doppler radar system

As is the case with the Doppler sonar, microwaves are directed to the ship from the dock or pier and the Doppler shift of the reflected waves is measured. Assuming that the frequency of the microwave used is 10GHZ ( $10_{10}$ HZ ) and that the speed of the ship to be docked is 1 cm/sec., the Doppler shift $\Delta f$ is given by the following equation.

$$\Delta f = 2(V/C)f_0 = 2(1/3 \times 10^{10}) \times 10^{10} = \tfrac{2}{3}(HZ)$$

where $V$ is the docking speed of the ship, $c$ is the velocity of the microwave and $f_0$ the frequency of the transmitted microwave. As is apparent from this, the measurement of the docking speed with a precision of 1 cm/sec cannot be achieved unless a microwave of higher frequency ( a millimeter wave ) is used.

2. Pulse radar system

At present, a radar of 10 GHZ is not suitable for measurement of a distance as short as several meters because of wide width of the pulse transmitted by the radar.

3. Frequency modulation system

This is a system generally used as a radio altimeter and its working frequency presents a problem in accuracy as is the case with the above systems.

In all of the conventional systems using the radio wave its frequency is 10 GHZ and its wavelength in air is about 3 cm., so that a difficulty is encountered in the detection of the speed of 1 cm/sec.

SUMMARY OF THE INVENTION

Accordingly, the primary object of this invention is to provide an extremely economical measuring instrument for piloting a ship for docking which is capable of measuring the docking speed of the ship and the distance between the bow and a pier by the use of electro-mechanical transducers each of which has means for producing ultrasonic waves upon reception of electric signals and means for producing electric signals upon reception of ultrasonic waves installed only on the side of the pier.

Another object of this invention is to provide a simply-constructed measuring instrument for piloting a ship for docking which comprises at least two ultrasonic transducers installed on a pier and measuring sections connected to them.

Still another object of this invention is to provide a measuring instrument for piloting a ship for docking with which the direction of the ship and the speeds of her bow and stern approaching a pier and the distances between them and the pier are simultaneously measured by at least two ultrasonic transducers installed on the pier and a measuring section connected to them and the measured results are reported to a pilot on the ship for bringing her to the pier in parallel therewith within a predetermined speed.

Other objects, features and advantages of his invention will become apparent from the following description taken in conjunction with the accompanying drawings.

BRIEF DESCRIPTION OF THE DRAWINGS

FIG. 1 is a schematic diagram showing the general principles of this invention; and FIG. 2 is a block diagram illustrating one example of a fundamental unit of a measuring section of the measuring instrument of this invention.

DESCRIPTION OF THE PREFERRED EMBODIMENTS

The present invention is widely applicable to piloting of ships for their docking operations but is of particular utility when employed for docking operations of giant or monster ships, so that the present invention will be described in connection with piloting the giant or monster ships for the docking operations.

In recent years oil tankers have rapidly become gigantic and a super oil tanker of 400,000 tons will be made in the near future. The docking operation of such a super tanker is a subject for further study and, at the same time, a measuring instrument which is suitable for piloting such a super tanker for docking is required for safe and accurate docking operation.

Generally, the full draught of the tanker is deep, and hence provision of a sea berth is required at most crude oil bases and the sea berth are almost always of a dolphin pier type. The dolphin pier is small in its occupying area on the sea surface and easy for maintenance and enables avoidance of mixing different crude oils by the provision of a pipe for each oil. However, the dolphin type pier is readily damaged seriously when collided by the ship, so that the docking speed of the ship is required to be less than 15 to 20 cm/sec. Accordingly, it is of prime importance to measure the docking speed of the ship with a precision of less than 1 cm/sec.

With reference to the drawings this invention will be described in detail. In FIG. 1 reference numeral 1 indicates a sea berth which consists of a pier 2 and dolphins 3 and 4 disposed on the pier 2 with a space therebetween at both ends. Reference numeral 5 designates a ship to be brought alongside the sea berth 1. The ship 5 is first stopped at a position about 100 meters off the sea berth 1 and is then steered to lie substantially parallel with a normal 6, namely the line joining one front surfaces of the dolphins 3 and 4, thereafter being pulled by a tugboat to approach the sea berth 1 in parallel therewith and finally moored by ropes to the dolphins 3 and 4. The speed of the ship approaching the sea berth 1 must be strictly controlled as previously mentioned.

The measuring instrument of this invention is made up mainly of transducers 7 and 8 respectively installed on the front legs of the dolphins 3 and 4 for transmitting and receiving a beams-like ultrasonic wave having a solid angle of, for example, about 12°, measuring sections 9 and 10 respectively corresponding to the transducers 7 and 8 and coaxial cables 11 and 12 interconnecting the transducers 7, 8 and the measuring sections 9, 10, respectively. In addition, there is provided a display device 13 for indicating the measured results and a radio communication device (not shown) for reporting the measured results to a pilot on the ship. In this case it is preferred that the components except the transducers be installed on the pier 2 so as to simplify the construction of the measuring instrument.

With the present instrument, the time required for ultrasonic pulses emitted from the transducers 7 and 8 coming back thereto after being reflected by the ship 5 is measured and the distance between each of the transducers and the ship 5 is obtained from the measured time on the basis of the known velocity of ultrasonic wave. While, for the measurement of the docking speed, the time interval of the emission of the ultrasonic pulses is defined accurately and the distance measured at any particular time is subtracted from that measured by the preceding measurement, thus obtaining the speed of the ship.

To facilitate a better understanding of this invention, a description will be given in connection with the theory of this invention for the distance and speed measurement on the assumption that the time interval of the emission of the ultrasonic pulses is 1 second.

A. Distance Measurement

Assuming that the ship 5 is at a distance $L$ off the pier at a time $t = 0$ and is approaching the pier at a speed $V$ and that a ultrasonic pulse emitted at the time $t = 0$ strikes against the ship 5 after a time $\Delta t_1$, the time $\Delta t_1$ is given by the following equation $$\Delta t_1 = (L - V\Delta t_1)/C$$
$$\therefore \Delta t_1 = L/(C + V)$$

where $C$ is the velocity of the ultrasonic wave in water. Accordingly, the pulse emitted at the time $t = 0$ is received after a time $2\Delta t_1$ by the receiver and if the distance to be measured is taken as $L_0$, it is given by the following equation.

$$L_0 = \Delta t_1 \cdot C$$
$$= L C/(C + V)$$
$$\doteqdot L (1 - V/C)$$

Assuming that $C = 1,500$ m/sec. and that $V = 0.15$ m/sec., the difference between $L$ and $L_0$ is 0.01 percent.

B. Speed Measurement

The distance $L_0$ measured by the pulse emitted at the time $t = 0$ is $LC/(C + V)$ and that $L_1$ by the pulse emitted at the time $t = 1$ is $(L - V)C/(C + V)$, since the distance of the ship from the pier at the time $t = 1$ is $(L - V)$.

Consequently, the speed $V$ to be measured is given by the following equation as the difference between the distances in 1 second.

$$V = L_0 - L_1$$
$$= V [C/(C + V)]$$
$$\doteqdot V[1 - (V/C)]$$

In this case, if $C = 1,500$ m/sec. and $V = 0.15$ m/sec., an error in the measurement is on the order of 0.01 percent.

It will be understood from (A) and (B) above that the degree of error in the measurement by the instrument of this invention is negligible.

Referring now to FIG. 2 showing the measuring section 9 connected to the ultrasonic transducer 7, a description will be made of one example of the fundamental unit of the instrument of this invention. A timer 21 of the measuring unit 9 generates a clock pulse at intervals of 1 second and a pulser 22 produces an electric transmitting pulse every second in response to the clock pulse, by which a ultrasonic pulse is emitted from the transducer 7. The ultrasonic pulse propagated in the water strikes against the hull of the ship 5 and then is thereby reflected back to the transducer 7. The received pulse is thereby converted into an electric signal and is amplified by a receiving amplifier unit 23 to serve as a stop signal of a gate circuit 24. While, the transmitting signal of the pulser 22 is applied through a delay circuit 25 to the gate circuit 24 to serve as a start (open) signal thereof.

Generally, the transducer 7 is located back from the front edge of the dolphin 3 by a distance $d$ but the distance desired to be measured is the distance $L$ from the front edge of the dolphin 3 to the ship 5, so that the aforementioned delay circuit 25 is adapted to compensate for the time necessary for the ultrasonic pulse to propagate the distance $d$. With the transducer 7 standing back from the front edge of the dolphin 3 by the distance $d$ as in the present example, the dead zone where measurements are impossible due to the transmitting pulse width can be removed. Accordingly, damage of the ship and / or the pier due to collision can be prevented by rendering measurable the distance forwardly from the front edge of the dolphin 3.

A measuring pulse generator 26 produces a pulse of, for example, 750 KHZ and its pulse interval is the time in which the ultrasonic wave goes and comes back 1 mm in the water, namely the time for the ultrasonic wave to propagate a distance of 2 mm in the water. Assuming that the velocity of sound (ultrasonic wave) in the water is 1,500 m/sec, the time $T$ necessary for the ultrasonic wave to propagate the distance of 2 mm in the water is given by the following equation.

$$T = (2 \text{ mm}/1,500 \text{ m/sec}) = (2/1.5) \times 10^{-6} S$$

Consequently the frequency of the ultrasonic wave in the water is the reciprocal of the above time $T$ as follows.

$$(1.5/2) \times 10^6 S^{-1} = 0.75 \times 10^6 HZ = 750 \text{ KHZ}$$

As set forth above, the gate circuit 24 is opened by a pulse delivered through the delay circuit 25 and is closed by the received pulse through the amplifier 23 and permits the passage therethrough of the pulse derived from the measuring pulse generator 26 while the circuit remains open, so that the distance desired to be measured, namely between the ship and the piers, can be displayed in a digital manner by counting the number of the pulses having passed through the gate circuit 24. The pulses passed through the gate circuit 24 are supplied, for example, to a decimal counter 27 for counting the pulses. In the illustrated example the output of the counter 27 is fed to a memory circuit 28 to hold its value for 1 second and the output of the memory circuit 28 is supplied to an indicator circuit 29 thereby to provide a display of the distance measured.

The speed of the ship approaching the sea berth is measured in the following manner. A first pulse train having passed through the gate circuit 24 is supplied to the minus (−) side of a counter 30 and, at the same time, a signal is applied from the timer 21 to the counter 30 to reset it immediately. The same first pulse train having passed through the gate circuit 24 and fed to the counter 27 is applied to the counter 30 while being shifted to its plus (+) side by supplying a signal to the counter 27 from the timer 21. Then, a second pulse train having passed through the gate circuit 24 is fed to the minus side of the counter 30 and is subtracted from the pulse train supplied to the counter 30 from the counter 27. The subtracted result is applied through a memory circuit 31 to a display device 32 to provide a display of the measured value.

Thus, the docking speed of the ship can be continuously indicated by repeating the above operation. The control operations such as, for example, setting and resetting of the counters, memory circuits and display circuit may take place by known methods, and accordingly no detailed description will be given.

In the speed indication, the speeds of the ship approaching and leaving the sea berth can be distinguishably indicated with "$f$" and "−" signs respectively and the precision of the speed indication on the order of cm/sec can be enhanced by effecting, the measurement in the order of mm. Although the foregoing description has been made of the measuring section 9, the other measuring unit 10 is exactly identical in construction and in operation with the above-described one.

The outputs of the measuring sections 9 and 10 are applied to an electric indicator board 13 to display thereon the distance between the ships and the sea berth and the docking speed of the ship respectively for reporting the measured results to a pilot on the ship and, at the same time, the outputs of the measuring sections 9 and 10 are reported to the ship by radio In this case, the measured results may be reported to the pilot by means of either radio or electric indicating board. Accordingly, based upon the information thus obtained, the pilot of the ship commands the ship to steer in such a manner that the distances and speeds measured by the the measuring sections 9 and 10 may be equal to each other and within predetermined values for safe and sure docking of the ship. In FIG. 2 reference characters D and S indicate the outputs respectively representative of the distance and the speed which are applied to the display device 13.

While the foregoing example employs two transducers, the use of three or more transducers is effective for the docking operation when the ship to be docked is small or her bow and stern do not lie at predetermined positions.

Further, the measuring pulse need not always be of a constant frequency and it is possible to produce a measuring pulse, for example, by a sing-around method so as to enable compensation for the velocity of sound in the water and that measurement of a short distance can be effected by separately providing transmitters and receivers.

Although the present invention has been described in connection with docking of the ship, it will be seen that the invention is similarly applicable to the case where the ship leaves the sea berth.

In accordance with the present invention at least two spaced ultrasonic transducers are provided in the water under the pier in such a manner that ultrasonic beams are emitted in a direction substantially at right angles to the mooring normal and the transceivers are respectively connected to their corresponding measuring sections, by which the distance between the ship and pier and her speed are measured simultaneously and the measured values are reported to the pilot on the ship to steer the ship being docked or leaving the pier, as has been described in the foregoing. As will be understood from the foregoing description, the measuring instrument of this invention has the following many advantages in addition to its simple construction and reliability in measurements. The present instrument is far more economical than the conventional systems requiring installation of a measuring instrument for the docking operation on each ship. With the aforementioned Doppler system only the docking speed is measured but with the present invention the distance between the ship being docked and the pier as well as the docking speed can be measured by the employment of the pulse system. As compared with the system using radio waves, the present instrument is high in accuracy and is not subject to jamming and further the installation of the transducers under water secures safety against explosion, so that the instrument of this invention is of particular utility when employed in crude oil bases. In addition, the distances and the docking speeds being measured can be recorded by printers for obtaining data for determining an optimum docking procedure and in the event of a collision of the ship with the pier the data can be used to clear up the cause of the accident.

It will be apparent that many modifications and variations may be effected without departing from the scope of the novel concepts of this invention.

We claim as our invention:

1. A measuring instrument for piloting a ship for docking or leaving comprising at least two spaced ultrasonic transducer means respectively provided under water on the side of a pier for transmitting ultrasonic beams substantially perpendicular to the mooring line joining front surfaces of dolphins, measuring means respectively corresponding to the ultrasonic transducer means, means for measuring the distance between the ship and the pier and the speed of the ship, and means for reporting the measured values to a pilot on the ship.

2. A measuring instrument for piloting a ship for docking or leaving as claimed in claim 1 wherein the front end of each of the ultrasonic transducer means stands back from the front edge of the pier so that the time required for a ultrasonic pulse transmitted from the transducer means to travel back and forth between the front end of the transducer means and the front edge of the pier is greater than the pulse width.

3. A measuring instrument for piloting a ship for docking or leaving as claimed in claim 1 wherein each of the measuring means includes a first pulse generator for driving each of the transducer means, a receiving unit for receiving a signal from the transducer means, a second pulse generator, and a gate circuit which is opened by the output of the first pulse generator and closed by the output of the receiving unit and permits the passage therethrough of a pulse derived from the second pulse generator.

4. A measuring instrument for piloting a ship for docking or leaving as claimed in claim 3 which includes two counter means, memory means for temporally memorizing the outputs of the two counter means respectively and indicator means for indicating the outputs of the memory means respectively.

* * * * *